(12) United States Patent
Hopperstad et al.

(10) Patent No.: US 8,261,874 B2
(45) Date of Patent: Sep. 11, 2012

(54) ATTENUATING OUT OF BAND ENERGY EMITTED FROM SEISMIC SOURCES

(75) Inventors: Jon-Fredrik Hopperstad, Cambridge (GB); Robert Laws, Cambridge (GB); Julian Edward (Ed) Kragh, Finchingfield (GB)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 13/335,715

(22) Filed: Dec. 22, 2011

(65) Prior Publication Data

US 2012/0090914 A1 Apr. 19, 2012

Related U.S. Application Data

(62) Division of application No. 12/714,820, filed on Mar. 1, 2010, now Pat. No. 8,136,625.

(60) Provisional application No. 61/167,454, filed on Apr. 7, 2009, provisional application No. 61/229,448, filed on Jul. 29, 2009.

(51) Int. Cl.
  *G01V 1/04* (2006.01)

(52) U.S. Cl. ........ 181/120; 181/102; 181/104; 181/110; 181/118; 181/119; 367/144

(58) Field of Classification Search .................. 181/120, 181/102, 104, 110, 118, 119; 367/144
See application file for complete search history.

(56) References Cited

U.S. PATENT DOCUMENTS

| | | | | |
|---|---|---|---|---|
| 3,837,424 | A * | 9/1974 | Itria | 181/120 |
| 4,007,805 | A * | 2/1977 | Reber | 181/120 |
| 4,712,202 | A * | 12/1987 | Chelminski | 367/144 |
| 4,921,068 | A * | 5/1990 | Pascouet | 181/115 |
| 5,018,115 | A * | 5/1991 | Pascouet | 367/144 |
| 5,144,596 | A * | 9/1992 | Pascouet | 367/144 |
| 5,420,829 | A * | 5/1995 | Pascouet | 367/144 |
| 5,825,719 | A * | 10/1998 | Harrison, Jr. | 367/144 |
| 6,185,156 | B1 * | 2/2001 | Bouyoucos | 367/144 |
| 6,260,657 | B1 * | 7/2001 | Arnold et al. | 181/116 |
| 7,321,527 | B2 * | 1/2008 | Hopperstad et al. | 367/144 |

* cited by examiner

*Primary Examiner* — Forrest M Phillips

(57) ABSTRACT

A method for attenuating out of band energy emitted from a seismic source used in a marine seismic survey. The method includes disposing the seismic source in a body of water and releasing a gas into a volume of water surrounding the seismic source. The released gas may be configured such that it displaces the volume of water surrounding the seismic source at a rate less than $2.9 \times 10^6$ cubic-meters per cubic-second.

15 Claims, 7 Drawing Sheets

ATTENUATING OUT OF BAND ENERGY EMITTED FROM SEISMIC SOURCES

RELATED APPLICATIONS

This application is a divisional of U.S. patent application Ser. No. 12/714,820; filed Mar. 1, 2010; now U.S. Pat. No. 8,136,625 published as US 2010-0252356 A1; titled ATTENUATING OUT OF BAND ENERGY EMITTED FROM SEISMIC SOURCES; and which claims the benefit of and priority to U.S. Provisional Patent Application Ser. Nos. 61/167,454 (filed Apr. 7, 2009) and 61/229,448 (filed Jul. 29, 2009); the entire disclosures of which are incorporated herein by reference.

FIELD

Implementations of various techniques described herein generally relate to marine seismic exploration. More specifically, they relate to attenuating out of band energy emitted from marine seismic sources.

DESCRIPTION OF RELATED ART

The following descriptions and examples do not constitute an admission as prior art by virtue of their inclusion within this section.

Seismic sources, such as airguns, generate a pressure signal used in marine seismic exploration. Airguns can be described as having a chamber filled with a compressed gas that is released to the surrounding water through port(s). Each port is a conduit through which the compressed gas escapes the chamber and enters the surrounding water, thereby creating an acoustic pulse.

Prior art airguns emit significant acoustic pulses that have high amplitudes, forming high frequency acoustic energy. High frequency acoustic energy typically includes energy at frequencies that are of no use for imaging and are outside the frequency range of interest for seismic exploration. This out of band signal is considered noise, and may also adversely affect marine life.

Accordingly, there is a need to find ways for reducing amplitudes of the out of band frequencies emitted by seismic sources such as airguns.

SUMMARY

Described herein are implementations of various techniques and technologies for attenuating out of band energy emitted from seismic sources. In one implementation, a method for attenuating out of band energy emitted from a seismic source used in a marine seismic survey may include disposing the seismic source in a body of water and releasing a gas into a volume of water surrounding the seismic source. The released gas may be configured such that it displaces the volume of water surrounding the seismic source at a rate less than $2.9 \times 10^6$ cubic-meters per cubic-second.

The method for attenuating out of band energy emitted from a seismic source described above may be performed using various types of seismic sources. In one implementation, the seismic source may include an outer cylinder, an inner cylinder, an axis bar, an actuator and a gas supply. The inner cylinder may be disposed inside the outer cylinder such that the outer wall of the inner cylinder is flush with an inner wall of the outer cylinder. The outer cylinder and the inner cylinder may have one or more apertures such that the apertures of the inner cylinder are configured to align with the apertures of the outer cylinder at various rotational positions of the inner cylinder. The axis bar may be coupled to the inner cylinder such that it may rotate the inner cylinder. The actuator may be coupled to the axis bar such that the actuator may control the rate of rotation of the inner cylinder. The gas supply may be coupled to the inner cylinder such that the gas supply may provide a compressed gas inside the inner cylinder. The compressed gas may then be released into a body of water surrounding the seismic source when the apertures of the inner cylinder align with the apertures of the outer cylinder. The released compressed gas may be configured to displace a volume of water surrounding the seismic source at a rate less than $2.9 \times 10^6$ m$^3$/s$^3$.

In another implementation, the seismic source may include a barrel, a piston, a gas supply, an axis bar and an actuator. The piston may be disposed inside the barrel, and the gas supply may be coupled to the barrel. The gas supply may be configured to provide a gas at ambient pressure inside the barrel. The axis bar may be coupled to the piston such that the axis bar is configured to move the piston across the barrel. The actuator may be coupled to the axis bar such that the actuator controls the axial motion of the piston. The axial motion of the piston may be used to compress the gas at ambient pressure inside the barrel and release the compressed gas into a volume of water surrounding the barrel. The released compressed gas may be configured to displace that volume of water surrounding the barrel at a rate less than $2.9 \times 10^6$ m$^3$/s$^3$.

In yet another implementation, the seismic source may include a barrel, an igniter, a mixture supply and an actuator. The igniter and the mixture supply may be coupled to the base of the barrel. The mixture supply may provide a combustible mixture to the base of the barrel. The actuator may be coupled to the igniter and may control the ignition of the igniter. The ignition of the igniter may cause the combustible mixture to combust such that the combusted combustible mixture may displace a volume of water surrounding the barrel at a rate less than $2.9 \times 10^6$ m$^3$/s$^3$.

In still yet another implementation, the seismic source may include a housing, one or more ports coupled to the housing, and one or more radial pipes coupled to the ports. The housing may contain compressed gas that may be released into a body of water surrounding the seismic source via the ports. The radial pipes may be designed to restrict the release of the compressed gas into the body of water such that a volume of water surrounding the seismic source flows at a rate less than $2.9 \times 10^6$ m$^3$/s$^3$.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
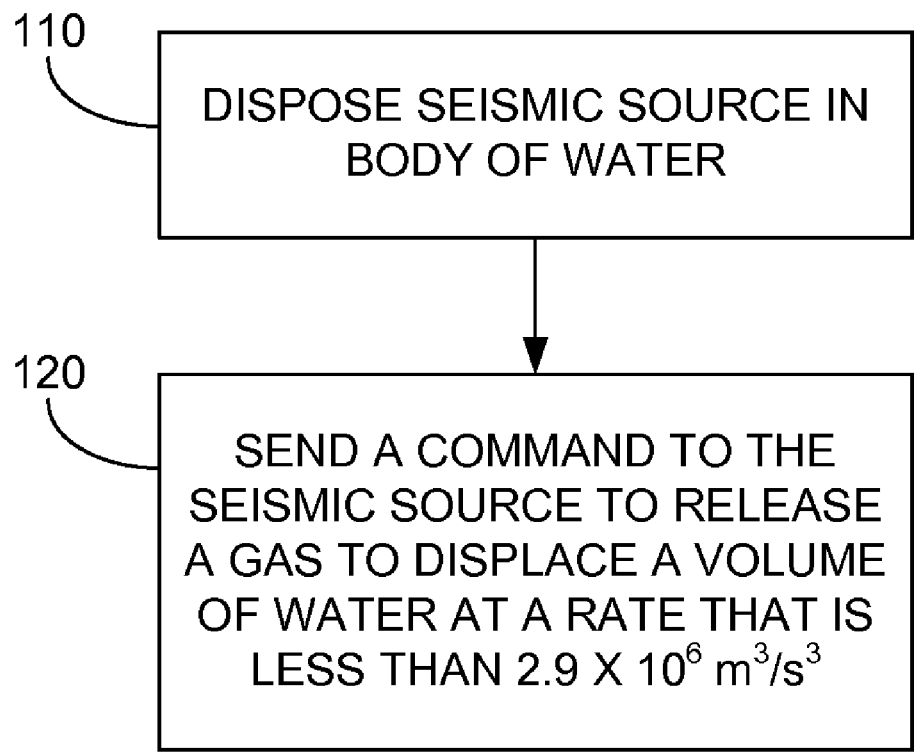
FIG. 1 illustrates a flow diagram of a method for attenuating out of band energy emitted from a seismic source in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at attenuating out of band energy emitted from a seismic source. In one implementation, the out of band energy emitted from a seismic source may be attenuated by disposing the seismic source in a body of water and sending a command to the seismic source to release a gas into the body of water such that the volume of water surrounding the seismic source is displaced by the released gas at a rate less than $2.9 \times 10^6$ cubic-meters per cubic-seconds ($m^3/s^3$). By limiting the rate at which the volume of water is displaced by the gas released by the seismic source, the out of band energy emitted from the seismic source is effectively attenuated.

In another implementation, a rotary valve seismic source may be used to attenuate the out of band energy emitted therefrom according to the process described above. The rotary valve seismic source may include a fixed outer cylinder, a rotatable inner cylinder, an axis bar coupled to the inner cylinder, an actuator coupled to the axis bar and an external gas supply coupled to a chamber inside the inner cylinder. The inner cylinder may be flush with the outer cylinder such that air may not exist between the two cylinders. Both cylinders may include one or more cylinder windows (i.e., outer cylinder windows and inner cylinder windows). The inner cylinder windows and outer cylinder windows may be the same size and shape and may coincide with each other when the inner cylinder is rotated to a particular position with respect to the outer cylinder. The axis bar may rotate the inner cylinder in a circular motion about the axis bar such that the inner cylinder windows may coincide with the outer cylinder windows at various positions during the rotation of the inner cylinder. The rate at which the inner cylinder rotates (i.e., rate of rotation) may be controlled by the actuator. The external gas supply may provide a compressed gas to the chamber of the inner cylinder.

In order to attenuate the out of band energy emitted from the rotary valve seismic source according to the process described above, the rotary valve seismic source may first be disposed in a body of water and then its inner cylinder may be rotated such that the compressed gas inside the chamber of the inner cylinder may be released when the inner cylinder window coincides with the outer cylinder window. By controlling the rate of rotation of the inner cylinder, the rotary valve seismic source may control the rate at which the volume of water surrounding the rotary valve seismic source is displaced by the compressed gas released by the rotary valve seismic source. The rate of rotation of the inner cylinder may be configured such that volume of water displaced by the released gas is at a rate less than $2.9 \times 10^6$ $m^3/s^3$.

In yet another implementation, a gas piston seismic source may be used to attenuate the out of band energy emitted therefrom according to the process described above. The gas piston seismic source includes a barrel, a piston, an axis bar coupled to the piston, an actuator coupled to the axis bar and an external gas supply coupled to an inside portion of the barrel. The barrel may be a cylinder that has one open end. The piston may fit inside the barrel such that it is flush with the barrel and may move along the axis bar inside the barrel. The actuator may control the axial motion of the piston via the axis bar. The actuator may also control the rate at which the piston may move. This rate may be referred to as the axial displacement of the piston as a function of time. The external gas supply may provide a low pressure gas to the inside portion of the barrel.

In order to attenuate the out of band energy emitted from the gas piston seismic source according to the process described above, the gas piston seismic source may first be disposed in a body of water such that the open end of the barrel is disposed into the body of water first. Before the gas piston seismic source is disposed in the body of water, the piston may be positioned away from the opening of the barrel. After the gas piston seismic source is disposed in the body of water, the external gas supply may provide the inside portion of the barrel with a gas at ambient pressure. The gas ambient pressure may remain inside the barrel and separate from the body of water based on its buoyancy characteristics. The line between the gas at ambient pressure and the body of water may be referred to as the gas/water interface. The actuator may then send a command to the axis bar to move the piston towards the gas/water interface. In this manner, the piston may push the gas at ambient pressure against the gas/water interface. By pushing the gas at ambient pressure against the gas/water interface, the gas piston seismic source may compress the gas at ambient pressure and release the compressed gas into the body of water. In one implementation, the compressed gas released into the body of water may displace the volume of water surrounding the gas piston seismic source. The rate at which the volume of water surrounding the gas piston seismic source is displaced by the released gas may be controlled by the axial displacement of the piston as a function of time. Accordingly, the axial displacement of the piston as a function of time may be configured such that the rate of the volume of water displaced by the released gas is less than $2.9 \times 10^6$ $m^3/s^3$.

In still another implementation, a controlled combustion seismic source may be used to attenuate the out of band energy emitted therefrom according to the process described above. The controlled combustion seismic source includes a barrel, a spark plug coupled to the base of the barrel, an actuator coupled to the spark plug, and an external fuel/oxidizer supply coupled to the base of the barrel. Here, the barrel may include one open end and may be shaped as a cone, a bell or the like. The external fuel/oxidizer supply may provide the base of the barrel with a fuel/oxidizer, which may be a combustible mixture of liquid or gas that has a known burn rate.

In order to attenuate the out of band energy emitted from the controlled combustion seismic source according to the process described above, the controlled combustion seismic source may first be disposed in a body of water such that the open end of the barrel is disposed into the body of water first. The external fuel/oxidizer supply may then fill the base of the barrel with the fuel/oxidizer. The fuel/oxidizer may remain at the base of the barrel and separate from the body of water based on its density properties. After the controlled combustion seismic source is disposed in the body of water, the actuator may send a command to the spark plug to ignite the fuel/oxidizer. In response to the spark plug igniting the fuel/oxidizer, the fuel/oxidizer may combust into an expanding gas. The expanding gas may then be released into the volume of water surrounding the controlled combustion seismic source and displace the volume of water surrounding the controlled combustion seismic source. The rate at which the volume of water surrounding the controlled combustion seismic source is displaced by the expanding gas may be controlled by the burn rate of the fuel/oxidizer and the shape of the barrel. Accordingly, the fuel/oxidizer may be selected and the shape of the barrel may be configured such that the rate of the volume of water displaced by the expanding gas released by the controlled combustion seismic source is less than $2.9 \times 10^6$ m$^3$/s$^3$.

In still yet another implementation, a radial pipe may be coupled to a seismic source to attenuate the out of band energy emitted from the seismic source according to the process described above. The radial pipe includes a square cylinder and a bell coupled to the square cylinder. In one implementation, the square cylinder may be configured to couple to a port of a seismic source such the radial pipe may effectively become part of the seismic source.

In order to attenuate the out of band energy emitted from a seismic source according to the process described above, a radial pipe may be coupled to each port of the seismic source. The seismic source may then be disposed in a body of water. As the seismic source is disposed in the body of water, the radial pipes may fill with water. After the seismic source is disposed in the body of water, the seismic source may release a compressed gas through its ports. As the compressed gas is vented through the ports of the seismic source, the compressed gas may first blow out the water inside the radial pipes before it releases the compressed gas into the body of water outside the radial pipes. In this manner, the mass of water inside the radial pipes may cause the initial expansion of the compressed gas released from the port of the seismic source into the body of water to take place more slowly. By causing the initial expansion of the compressed gas from the port to take place more slowly, the radial pipes may limit the displacement of the volume of water surrounding the seismic source to a rate less than $2.9 \times 10^6$ m$^3$/s$^3$. As a result, the radial pipes may reduce the steepness of the rising edge of the pressure pulse emitted by seismic source, thereby attenuating the out of band energy that the seismic source emits into the body of water.

One or more implementations of various techniques and apparatuses for attenuating out of band energy emitted from a seismic source will now be described in more detail with reference to FIGS. 1-7 in the following paragraphs.

FIG. 1 illustrates a flow diagram of a method 100 for attenuating out of band energy emitted from a seismic source in accordance with implementations of various techniques described herein. As mentioned above, conventional seismic sources typically emit significant acoustic amplitude (i.e., high frequency energy) that is outside the frequency range of interest for seismic exploration. This phenomenon is generally due to the sudden displacement of the volume of water that surrounds the conventional seismic source. For example, marine seismic airguns produce a sound pulse by suddenly releasing a volume of compressed air into a body of water. Generally, these types of marine seismic airguns have been designed to release air as quickly as possible, without regard to the possible environmental effects of the high frequencies acoustic amplitudes emitted into the body of water. In fact, airguns have been designed to release air as rapidly as possible such that it may emit an acoustic pulse with the highest possible amplitude. This rapid release of air corresponds to a very steep rising edge in a primary pressure pulse received by the body of water. The steep rise in the primary pressure pulse has been attributed to the origin of the high frequency energy (i.e., out of band signal) that is beyond the frequency range of interest to seismic imaging. This high frequency energy typically includes unnecessary sound that can be disturbing to marine animals in the body of water.

The out of band (i.e., high frequency) energy created in the body of water by the seismic sources, however, may be attenuated by decreasing the rate at which the volume of water that surrounds the seismic source is displaced by the released gas. In one implementation, the rate at which the volume of water that surrounds the seismic source is displaced by the released gas may correspond to a rising slope of a pressure pulse received by the body of water. Additional details pertaining to the pressure pulse received by the body of water will be described below with reference to FIG. 2.

At step 110, a seismic source may be disposed in a body of water. In one implementation, the body of water may be part of a marine seismic survey area where the seismic source may be used to locate hydrocarbons in subterranean formations of the earth. The seismic source may include any marine-type seismic source that releases gas into a body of water such that the gas may displace a volume of water surrounding the seismic source.

At step 120, a command may be sent to the seismic source disposed in the body of water to release a gas into the body of water such that the volume of water surrounding the seismic source is displaced by the released gas at a rate less than $2.9 \times 10^6$ cubic-meters per cubic-seconds (m$^3$/s$^3$). In one implementation, the rate at which the volume of water surrounding the seismic source is displaced by the released gas may be measured according to a third differential of the volume of the water displaced by the gas released by the seismic source with respect to time (i.e., $d^3V/dt^3$). The third differential of the volume of the water displaced by the gas released by the seismic source with respect to time may be described as the rate at which the acoustic pressure in the body of water changes over time. By limiting the rate at which the volume of water surrounding the seismic source is displaced by the released gas to less than $2.9 \times 10^6$ m$^3$/s$^3$, method 100 may attenuate the out of band acoustic amplitudes from being emitted into the body of water. In one implementation, the rate at which the volume of water is displaced by the released gas is between $0.6 \times 10^6$ m$^3$/s$^3$ and $1.8 \times 10^6$ m$^3$/s$^3$, as shown in the equation below.

$$\frac{d^3 V}{dt^3} \in [0.6 \cdot 10^6, 1.8 \cdot 10^6] \text{metres}^3/\text{second}^3$$

In contrast, conventional seismic sources typically displace the volume of water at a rate greater than $2.9 \times 10^6$ m$^3$/s$^3$. Consequently, these conventional seismic sources often emit out of band acoustic amplitudes into the body of water.

In one implementation, the third differential with respect to time of the volume of the water displaced by the released gas may be measured by calculating the slope of the second differential with respect to time, i.e., the slope of the volume acceleration, of the water displaced by the released gas with respect to time. An equation for monopole acoustic pressure of a spherical gas bubble in an incompressible liquid may be used to calculate the slope of the volume acceleration with respect to time. This equation may be used to determine the volume acceleration of the water surrounding the seismic source that is needed to emit an acoustic pulse from the seismic source that has attenuated acoustic amplitudes. The equation for the monopole acoustic pressure of a spherical gas bubble in an incompressible liquid may be expressed as:

$$P_{NS} = \frac{\rho_w}{4\pi} \cdot \frac{d^2 V}{dt^2} \qquad \text{(Equation 1)}$$

The monopole acoustic pressure, $P_{NS}$, is also referred to as the notional source signature. Furthermore, $\rho_w$, is the density of the surrounding water and, V, is the volume of the displaced water. The second time differential with respect to the displaced volume is referred to as the "volume acceleration." Additional details pertaining to calculating the slope of the volume acceleration with respect to time will be described below with reference to FIG. 3.

Figure 2:
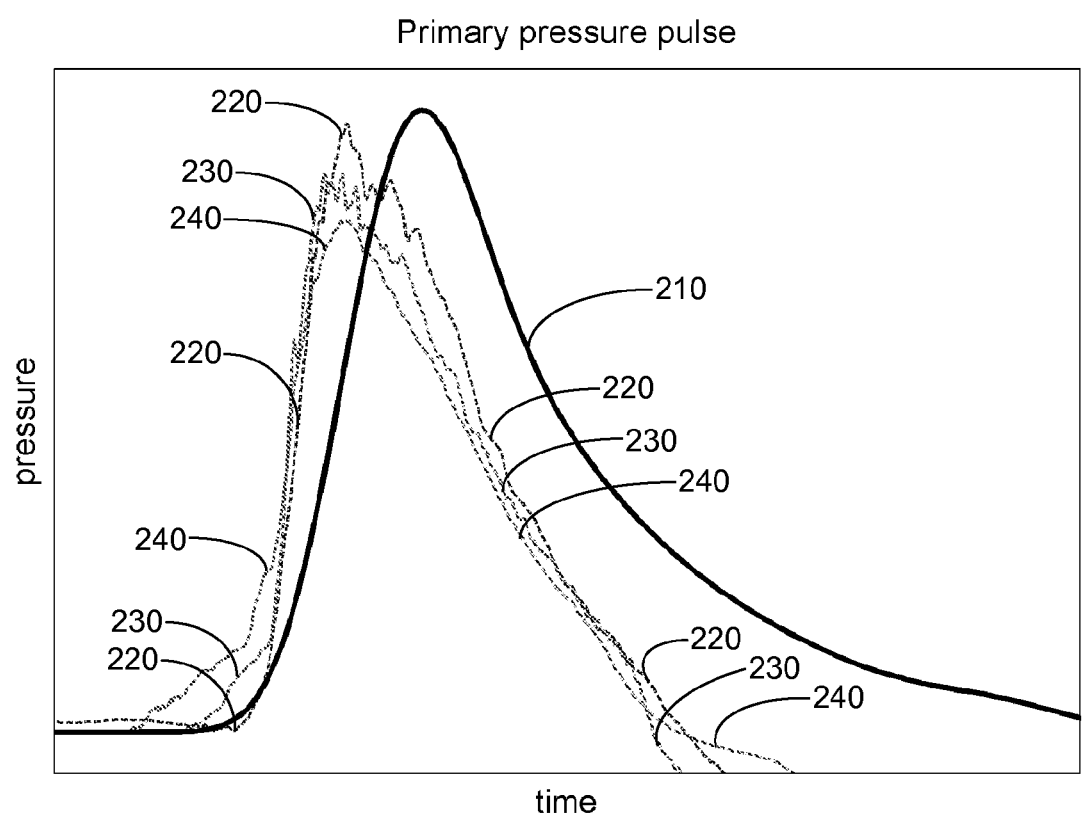
FIG. 2 illustrates a graph of a desired primary pressure pulse shape compared to examples of primary pressure pulse shapes of prior art seismic sources in accordance with implementations of various techniques described herein.

FIG. 2 illustrates a graph 200 of a desired primary pressure pulse shape compared to examples of primary pressure pulse shapes of prior art seismic sources in accordance with implementations of various techniques described herein. As mentioned above, conventional seismic sources emit significant amplitude (i.e., high frequency energy) outside the frequency range of interest for seismic exploration. FIG. 2 shows the primary pressure pulse shape of three prior art commercial airguns that emit significant amplitude outside the frequency range of interest for seismic exploration. The primary pressure pulses of the prior art commercial airguns are denoted in graph 200 as dashed lines (i.e., curve 220, curve 230 and curve 240). Curve 220 is a primary pressure pulse for a prior art Input Output® sleeve airgun. Curve 230 is a primary pressure pulse for a prior art Bolt® airgun. Curve 240 is a primary pressure pulse for a prior art Sodera® airgun. Curve 210 is a desired pressure pulse shape in accordance with implementations of various techniques described herein. As shown in FIG. 2, the rising slope of curve 210 is significantly smaller than the rising slopes of curve 220, curve 230 and curve 240. The steep rising slope of the primary pressure pulses for the prior art airguns illustrated in curves 220, 230 and 240 may result in an acoustic amplitude outside the frequency range of interest. As such, by modifying the primary pressure pulse emitted by the seismic source to resemble the rising slope of the desired pressure pulse shape (i.e., curve 210), the acoustic amplitudes (i.e., high frequency energy) may thereby be attenuated such that most of the amplitudes are within the frequency range of interest. In one implementation, the desired pressure pulse shape (i.e., curve 210) may be obtained by limiting the release of gas from the seismic source such that the rate at which the volume of the water surrounding the seismic source is displaced by the released gas is less than $2.9 \times 10^6$ m$^3$/s$^3$, as described in FIG. 1.

Figure 3:
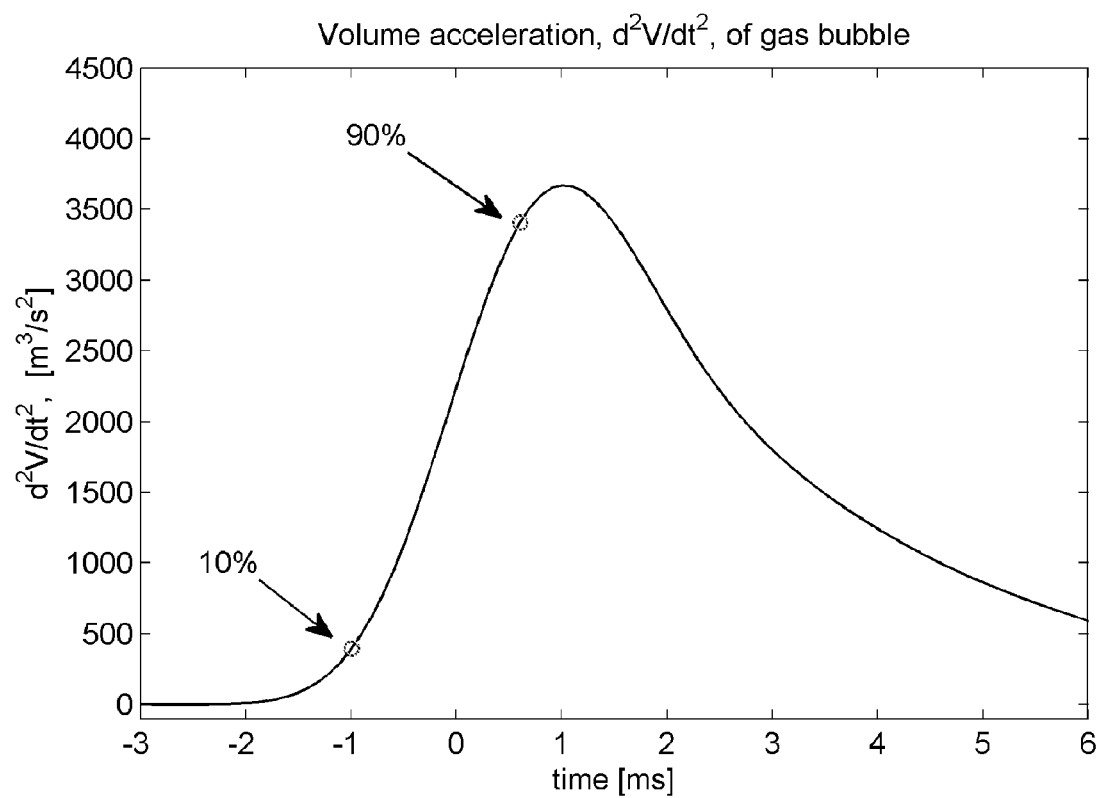
FIG. 3 illustrates a graph used for calculating an average rising slope of a primary pressure pulse in accordance with implementations of various techniques described herein.

FIG. 3 illustrates a graph 300 used for calculating an average rising slope of a primary pressure pulse in accordance with implementations of various techniques described herein. In one implementation, the third differential of the volume of the water displaced by the released gas with respect to time is the average rising slope of the pressure pulse emitted from the seismic source into the body of water, as illustrated in FIG. 2. The average rising slope of the pressure pulse may be calculated as the slope between 10 percent and 90 percent of an unfiltered pressure pulse signature recorded up to 50 kHz, i.e., the slope between the 10 percent and 90 percent of the maximum value of the second differential of the volume of the water displaced by the gas released by the seismic source with respect to time. For instance, in FIG. 3, the circles on the primary pressure pulse indicate a 10% point and a 90% point of the unfiltered signature recorded up to 50 kHz. The average slope of the volume acceleration between these points will result in a value that is measured in cubic-meters per cubic-second (i.e., m$^3$/s$^3$). As such, the slope of the volume acceleration has the same units as the third differential of the volume of the water displaced by the released gas with respect to time.

Figure 4:
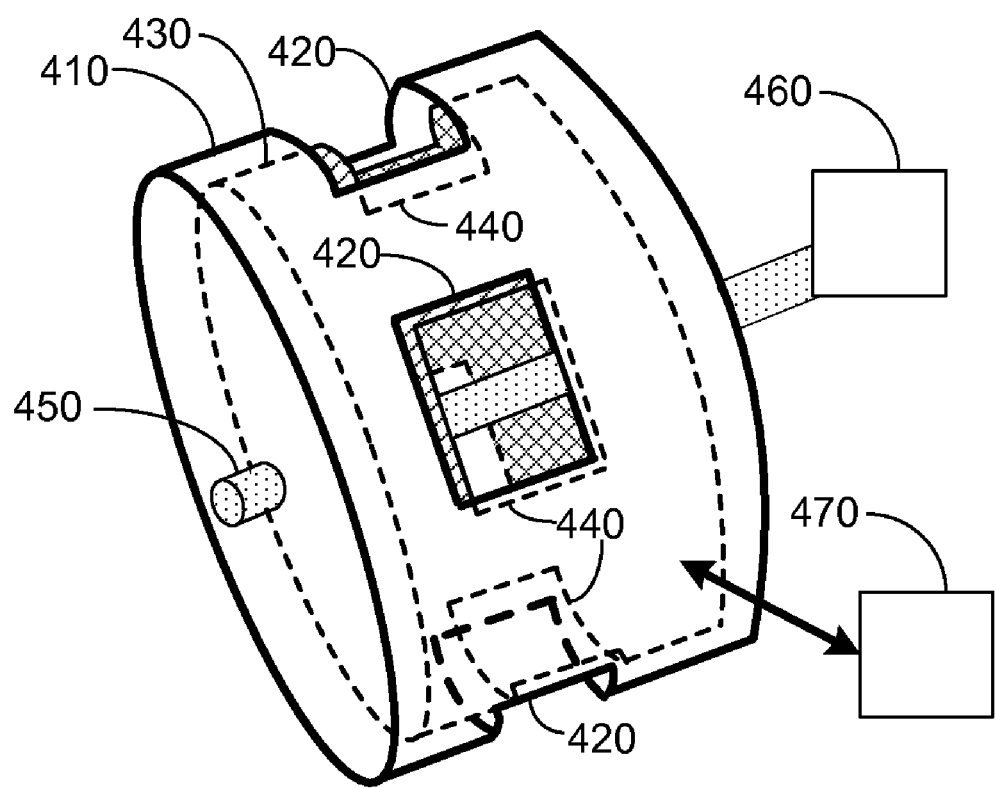
FIG. 4 illustrates a rotary valve seismic source for attenuating out of band energy emitted therefrom in accordance with implementations of various techniques described herein.

FIG. 4 illustrates a rotary valve seismic source for attenuating out of band energy emitted therefrom in accordance with implementations of various techniques described herein. In one implementation, the rotary valve seismic source 400 may be used to release a gas into a body of water such that the volume of water surrounding the rotary valve seismic source 400 is displaced by the released gas at a rate less than $2.9 \times 10^6$ m$^3$/s$^3$. The rotary valve seismic source 400 includes an outer cylinder 410, an inner cylinder 430, an axis bar 450, an actuator 460 and an external gas supply 470. The outer cylinder 410 may be immobile while the inner cylinder 430 may rotate about the axis bar 450. Further, the inner wall of the outer cylinder 410 may be flush with the outer wall of the inner cylinder 430 such that air may not exist between the two cylinders. In one implementation, a sealing mechanism may be used between the outer cylinder 410 and the inner cylinder 430 to ensure that there is no air between the two cylinders. The outer cylinder 410 may include one or more outer cylinder windows 420, and the inner cylinder 430 may include one or more inner cylinder windows 440. The outer cylinder windows 420 and the inner cylinder windows 440 may be square shaped apertures on the surface of the outer cylinder 410 and the inner cylinder 430, respectively. The outer cylinder windows 420 may be the same size as the inner cylinder windows 440. The outer cylinder windows 420 may be positioned on the outer cylinder 410 such that the inner cylinder windows 440 may coincide or align with the outer cylinder windows 420 when the inner cylinder is rotated to a particular position with respect to the outer cylinder. Although the outer cylinder windows 420 and the inner cylinder windows 440 have been described as being square shaped, it should be noted that in other implementations the outer cylinder windows 420 and the inner cylinder windows 440 may be arbitrarily shaped.

The axis bar 450 may be disposed through the center of the outer cylinder 410 and the inner cylinder 430. In one implementation, the inner cylinder 430 may be coupled to the axis bar 450 such that the axis bar 450 may rotate the inner cylinder 430. As the inner cylinder 430 rotates about the axis bar 450, the inner cylinder windows 440 coincide with the outer cylinder windows 420 at various times during the rotation of the inner cylinder 430.

The actuator 460 may be coupled to axis bar 450 and may control the rate at which the inner cylinder 430 rotates (i.e., rate of rotation). The external gas supply 470 may be coupled to a chamber, or the inside, of the inner cylinder 430 and provide a compressed gas to the chamber. In one implementation, the rotary valve enabled seismic source 400 may be used as the seismic source described in method 100. Referring back to step 110 in FIG. 1, the rotary valve seismic source 400 may be disposed in the body of water. Referring back to step 120, a command may be sent to the rotary valve seismic source 400 to release the compressed gas inside the chamber of the inner cylinder 430 into the body of water such that the volume of water displaced by the released gas is at a rate less than $2.9 \times 10^6$ m$^3$/s$^3$.

The rotary valve seismic source 400 may control the rate at which the volume of water is displaced by the released gas by controlling the rate of rotation of the inner cylinder 430. In one implementation, the external gas supply 470 may fill the chamber of the inner cylinder 430 with a compressed gas. When the inner cylinder 430 rotates, the compressed gas may be released when the inner cylinder window 440 coincides or aligns with the outer cylinder window 420. In this manner, the rate of rotation of the inner cylinder 430, together with the carefully designed shape of both the inner cylinder windows 440 and the outer cylinder windows 420, may be used to determine the rate at which the volume of water surrounding the rotary valve seismic source is displaced by the gas released by the rotary valve seismic source 400. The relationship between the rate of rotation of the inner cylinder 430 and the rate at which the volume of water surrounding the rotary valve seismic source 400 is displaced by the released gas may be based on an equation of motion of the volume of water outside the rotary valve seismic source 400, ideal gas law and an equation of rate of flow of the compressed gas through the outer cylinder window 420 and the inner cylinder window 440 when the outer cylinder window 420 and the inner cylinder window 440 are aligned. In order to displace the volume of water at a rate that is less than $2.9 \times 10^6$ m$^3$/s$^3$, the rate of rotation of the inner cylinder 430 may also be determined experimentally.

Figure 5:
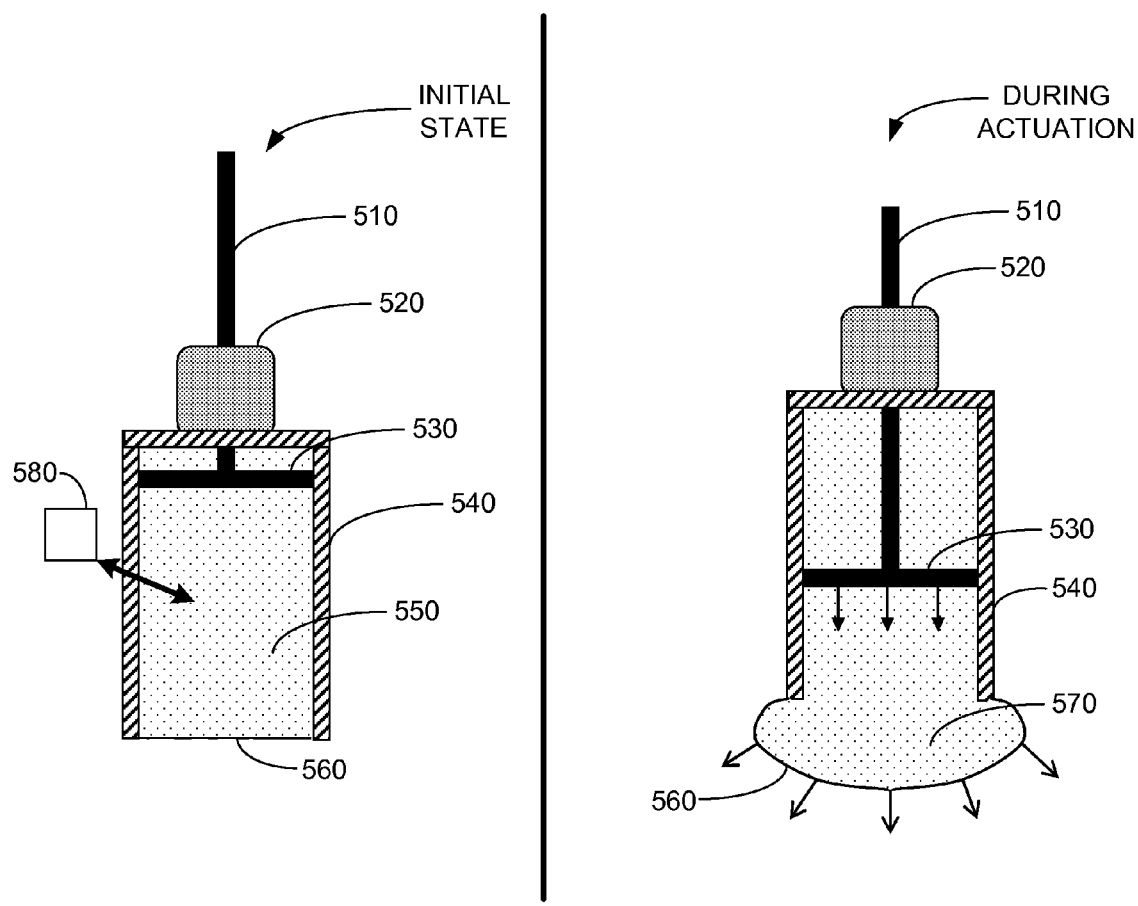
FIG. 5 illustrates a gas piston seismic source for attenuating out of band energy emitted therefrom in accordance with implementations of various techniques described herein.

FIG. 5 illustrates a gas piston seismic source 500 for attenuating out of band energy emitted therefrom in accordance with implementations of various techniques described herein. The gas piston seismic source 500 includes an axis bar 510, an actuator 520, a piston 530, a barrel 540 and an external gas supply 580. The actuator 520 is coupled to the axis bar 510, which is coupled to the piston 530. The actuator 520 controls the axial motion of the piston 530 by controlling the motion of the axis bar 510. In one implementation, the actuator 520 may be electric, hydraulic, pneumatic or mechanical such as a spring. The choice of the actuator 520 depends on the rate of a prescribed volume acceleration for displacing the volume of water surrounding the gas piston seismic source 500 when it is disposed in a body of water.

The outer walls of the piston 530 may be flush with the inner walls of the barrel 540. As such, the piston 530 may move in an axial motion across the barrel 540. In one implementation, the barrel 540 may be a cylinder where one end of the cylinder is removed. Here, the piston 530 may be a cylinder that fits flush inside the barrel 540. The external gas supply 580 may be coupled to the barrel 540. As such, the external gas supply 580 may fill the barrel 540 with a gas at ambient pressure 550. The gas at ambient pressure 550 may be a low pressure gas.

In one implementation, the gas piston seismic source 500 may be used as the seismic source described in method 100. Referring back to step 110 in FIG. 1, the gas piston seismic source 500 may be disposed in the body of water. When disposing the gas piston seismic source 500 in the body of water, the gas piston seismic source 500 may be positioned such that the open end of the barrel 540 is pointed toward the body of water, i.e., initial state of FIG. 5. By disposing the gas piston seismic source 500 in this manner, the gas at ambient pressure 550 may remain inside the barrel 540 and separate from the body of water. This is made possible by the buoyancy properties of the gas at ambient pressure 550 inside the barrel 540 with respect to the body of water. The line between the gas at ambient pressure 550 and the body of water may be referred to as the gas/water interface 560. In one implementation, prior to disposing the gas piston seismic source 500 into the body of water, the piston 530 may be positioned such that it is furthest away from the gas/water interface 560. After the gas piston seismic source 500 is disposed in the body of water, the gas supply 580 may fill the barrel 540 with the gas at ambient pressure 550.

Referring back to step 120, the gas piston seismic source 500 may release a gas into the body of water such that the rate at which the volume of water surrounding the gas piston seismic source 500 is displaced by the released gas is less than $2.9 \times 10^6$ m$^3$/s$^3$. In order to release the gas into the body of water, the actuator 520 may send a command to the axis bar 510 to move the piston 530 along its axis towards the gas/water interface 560. As shown in "During Actuation" of FIG. 5, the piston 530 may push the gas at ambient pressure 550 against the gas/water interface 560. In this manner, the gas at ambient pressure 550 may compress into a compressed gas 570. As the gas at ambient pressure 550 is compressed, the compressed gas 570 may be released into the volume of water surrounding the gas piston seismic source 500. The compressed gas 570 may consequently displace the volume of water surrounding the gas piston seismic source 500.

In order to release the compressed gas into the body of water such the volume of water surrounding the gas piston seismic source 500 is displaced at a rate less than $2.9 \times 10^6$ m$^3$/s$^3$, the piston 530 may be pushed toward the gas/water interface such that the water surrounding the gas piston seismic source 500 is displaced at a prescribed volume acceleration. In one implementation, the prescribed volume acceleration may correspond to the displacement of the piston 530 in the barrel 540 as a function of time. The displacement of the piston 530 as a function of time may be calculated based on ideal gas law and an equation of motion of the water surrounding the gas piston seismic source 500. The details of this calculation may depend on the details of the gas piston seismic source 500 design.

Figure 6:
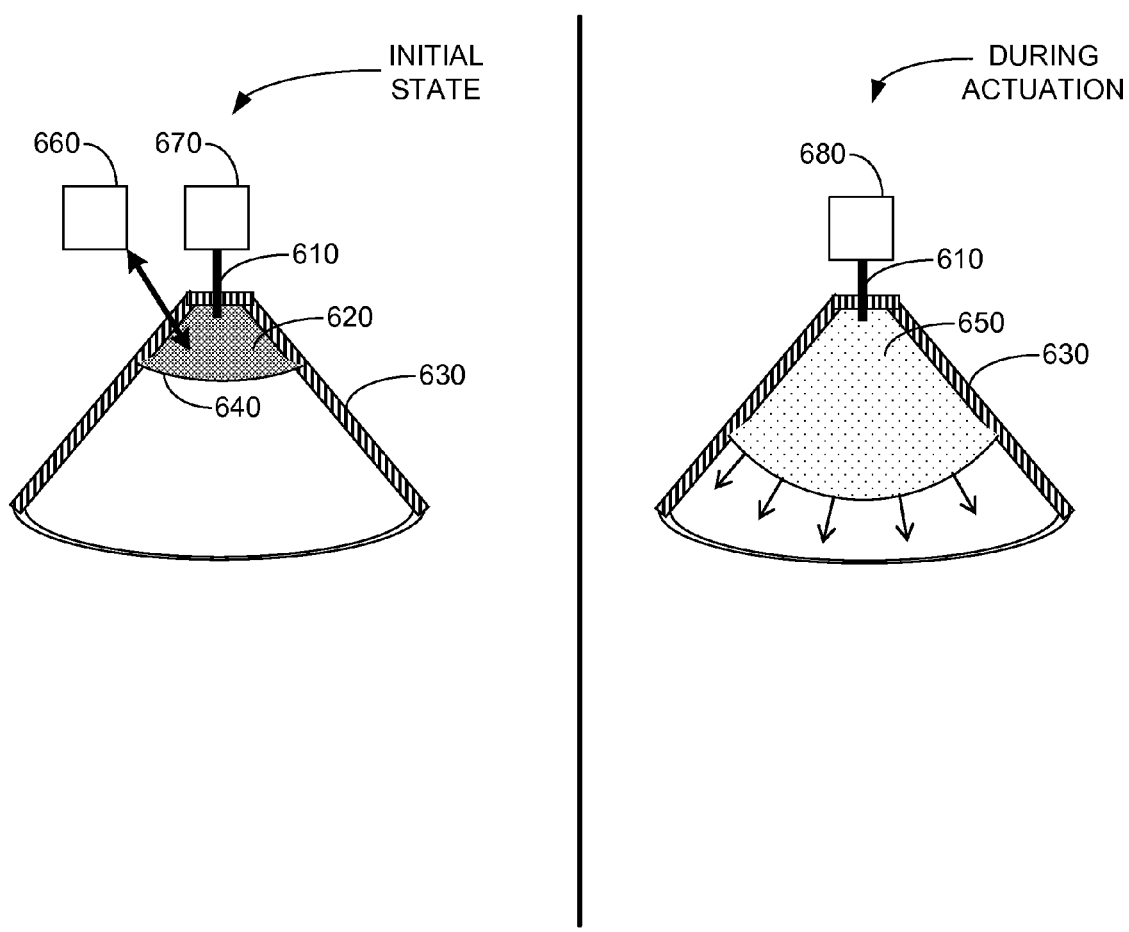
FIG. 6 illustrates a controlled combustion seismic source for attenuating out of band energy emitted therefrom in accordance with implementations of various techniques described herein.

FIG. 6 illustrates a controlled combustion seismic source 600 for attenuating out of band energy emitted therefrom in accordance with implementations of various techniques described herein. The controlled combustion seismic source 600 may include a spark plug 610, a combustible mixture 620, a barrel 630, an external combustible mixture supply 660 and an actuator 670. The spark plug 610 and the external combustible mixture supply 660 may be coupled to the base of the barrel 630. The external combustible mixture supply 660 may provide the base of the barrel 630 with a combustible mixture 620. The combustible mixture 620 may consist of a combustible mixture of one or more gases or one or more liquids such as fuels or oxidizers. The combustible mixture 620 may be designed such that it burns at a known rate. In one implementation, the combustible mixture 620 may consist of a mixture of propane and oxygen, a type of rocket fuel or the like. The spark plug 610, or igniter, may be coupled to the base of the barrel 630 such that a spark created from the spark plug 610 may ignite or combust the combustible mixture 620. The spark plug 610 may also be coupled to the actuator 670 such that the actuator 670 may control when the spark plug 610 may create a spark or ignition. The barrel 630 may be an open ended container such that the radius of the open end of the barrel 630 is larger than the opposite end (i.e., base) of the barrel 630. In one implementation, the barrel 630 may be shaped as a bell. However, it should be noted that in other implementations, the barrel 630 may be shaped as a cone or any other shape.

The controlled combustion seismic source 600 may be used as the seismic source described in method 100. Referring back to step 110 in FIG. 1, the controlled combustion seismic source 600 may be disposed in the body of water. When disposing the controlled combustion seismic source 600 in the body of water, the controlled combustion seismic source 600 may be positioned such that the opening of the barrel 630 is pointed downward. The barrel 630 may then be filled with the combustible mixture 620 from the external combustible mixture 620. When the controlled combustion seismic source 600 is disposed in a body of water, the line between the combustible mixture 620 and the body of water may be referred to as the fuel/water interface 640.

Referring back to step 120, the controlled combustion seismic source 600 may release a gas into the body of water such that the volume of water surrounding the controlled combustion seismic source 600 is displaced by the released gas at a rate that is less than $2.9\times10^6$ $m^3/s^3$. In order to release the gas into the body of water, the actuator 670 may send a command to the spark plug 610 to ignite the combustible mixture 620. As shown FIG. 6 ("During Actuation"), after the spark plug 610 ignites the combustible mixture 620, the combustible mixture 620 becomes an expanding gas 650 as a result of the heat release from the combustion of the combustible mixture 620. The expanding gas 650 may then be released into the volume of water surrounding the controlled combustion seismic source 600.

In one implementation, the burn rate of the combustible mixture 620 and the shape of the barrel 630 may be used to control the release of the expanding gas 650 into the body of water such that the volume of water surrounding the controlled combustion seismic source 600 is displaced at a rate less than $2.9\times10^6$ $m^3/s^3$. In this manner, the control parameters for determining the rate at which the volume of water surrounding the controlled combustion seismic source 600 is displaced include the chemical makeup of the combustible mixture 620 and the shape of the barrel 630. In one implementation, the relationship between the shape of the barrel 630 and the rate at which the volume of water surrounding the controlled combustion seismic source 600 is displaced may be determined via experimentation.

Figure 7:
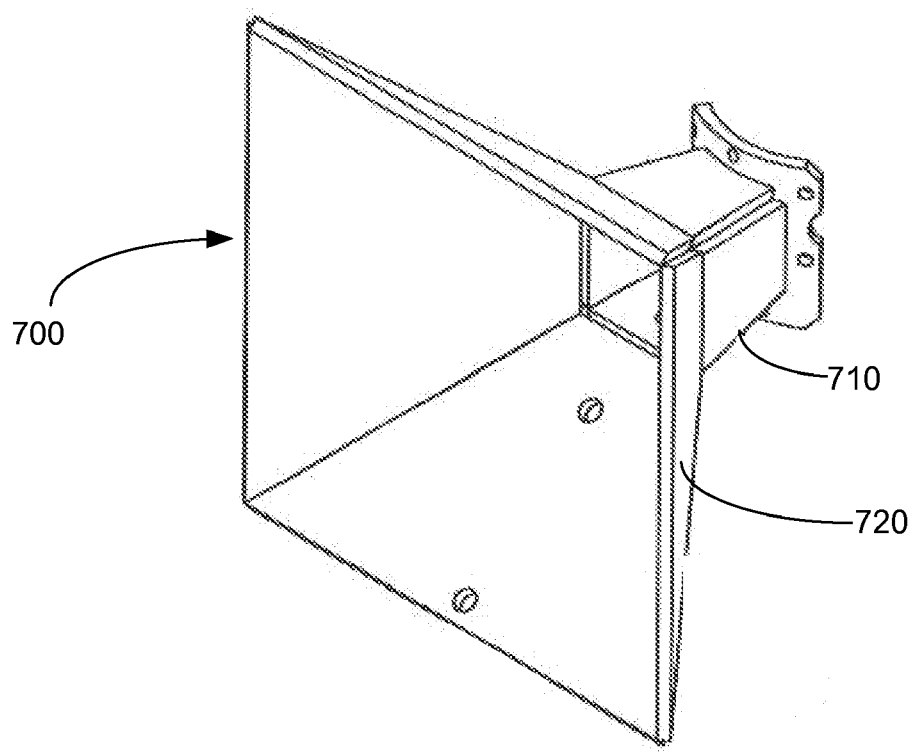
FIG. 7 illustrates a radial pipe coupled to a seismic source for attenuating out of band energy emitted from the seismic source in accordance with implementations of various techniques described herein.
Figure 7:
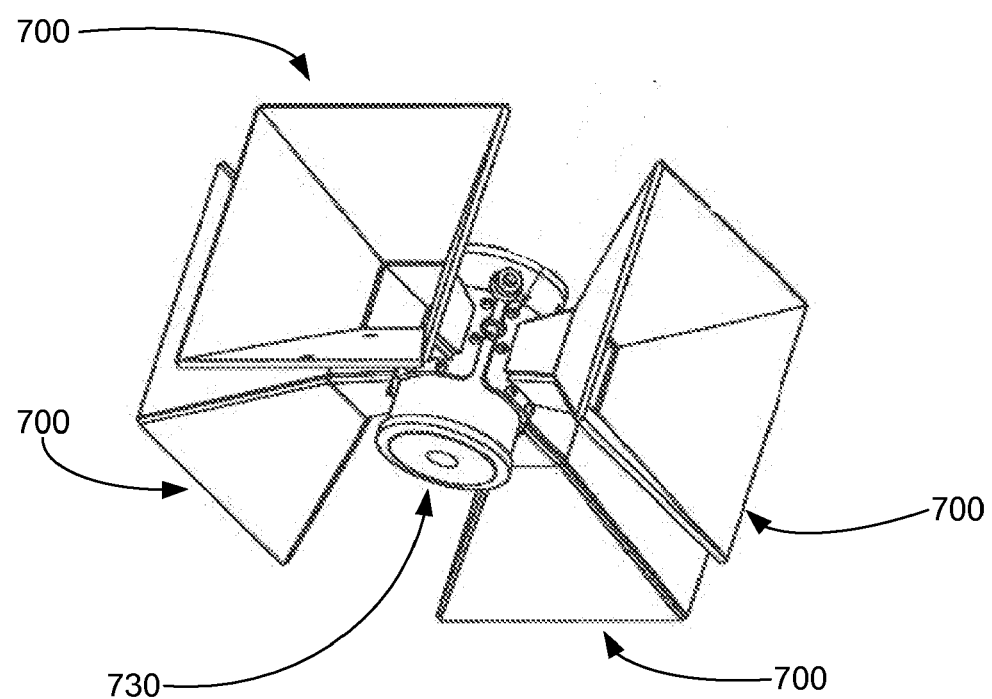

FIG. 7 illustrates a radial pipe 700 coupled to a seismic source for attenuating out of band energy emitted from the seismic source in accordance with implementations of various techniques described herein. In one implementation, the radial pipe 700 may consist of a square cylinder 710 and a bell 720. The square cylinder 710 may be coupled to a port of a seismic source 720 on one end and to the bell 720 on the other end. The seismic source 720 may be a device for releasing gas into a body of water, such as the device described in U.S. Pat. No. 7,321,527 or the controlled combustion seismic source 600 described above. The bell 720 may be open on both ends, but one end of the bell 720 may be larger than the other end of the bell 720. In one implementation, the smaller end of the bell 720 may be coupled to the square cylinder 710. As such, the smaller end of the bell 720 may have a square shape such that it matches the end of the square cylinder 710 that it is coupled to. The larger end of the bell 720 may also be square in shape, but it may have a larger radius than the smaller end of the bell 720. Although the square cylinder 710 and the bell 720 have been described as being square in shape, it should be noted that in some implementations the square cylinder 710 and the bell 720 may be shaped differently.

In one implementation, the radial pipe 700 may be coupled to a seismic source 730 to perform the method 100 described above. Referring back to step 110 in FIG. 1, the seismic source 730 may be disposed in the body of water. Prior to disposing the seismic source 730 in the body of water, however, one or more radial pipes 700 may be coupled to each port of the seismic source 730. The port of the seismic source 730 may include areas on the seismic source 730 where a gas may be released into the body of water. After the radial pipes are coupled seismic source 730, the seismic source 730 may be disposed in the body of water, and the radial pipes 700 may fill with water.

Referring back to step 120, the seismic source 730 may release a gas into the body of water such that the volume of water surrounding the seismic source 730 is displaced by the gas released by the seismic source at a rate less than $2.9\times10^6$ $m^3/s^3$. Typically, when a conventional seismic source, such as an airgun, is fired, the compressed gas inside the airgun is vented through the ports of the airgun to form a bubble in the surrounding water. The initial efflux of the compressed gas released into the water is very vast and the volume acceleration of the bubble is large. As a result, the initial pressure pulse that is radiated into the body of water surrounding the airgun has a very steep rise and the rate at which the volume of water surrounding the airgun is displaced by the gas released by the airgun is greater than $2.9\times10^6$ $m^3/s^3$.

In contrast, when radial pipes are coupled to the same seismic source 730, the volume of water surrounding the seismic source 730 may be displaced at a rate less than $2.9\times10^6$ $m^3/s^3$. In one implementation, when a compressed gas is released from the seismic source 730, the compressed gas is vented through the ports of the seismic source 730. As such, the compressed gas first blows out the water inside the radial pipes 700 before it is released into the body of water outside the radial pipes 700. The mass of water inside the radial pipes may restrict the flow of the volume of water outside the seismic source 730 and define how the compressed gas may be released into the body of water. Consequently, the radial pipes 700 may cause the initial expansion of the compressed gas from the port of the seismic source 730 into the body of water to take place more slowly. By causing the initial expansion of the compressed gas from the port to take place more slowly, the steepness of the rising edge of the pressure pulse emitted by seismic source 730 may be reduced, thereby reducing the high frequency output of the seismic source 730.

As mentioned above, various types of seismic sources 730 may produce various amplitudes of high frequency outputs. As such, the radial pipe 700 may be specifically designed for each type of seismic source 730 in order to reduce the high frequency outputs from these various types of seismic sources 730. The design parameters for the radial pipe 700 may include the length, shape and radii of the square cylinder 710 and the bell 720. In one implementation, the design parameters of the radial pipe 700 may be altered such that the rate at which the volume of water surrounding the seismic source 730 is displaced is less than $2.9\times10^6$ $m^3/s^3$. In this manner, different radial pipe 700 lengths and diameters may be used to match the rise time of the pressure pulse emitted by the seismic source 730 to the required seismic bandwidth output, thereby minimizing the unnecessary high frequency output. The length, shape and radii of the square cylinder 710 and the bell 720 of the radial pipes 700 required to displace the

What is claimed is:

1. A method for attenuating out of band energy emitted from a seismic source used in a marine seismic survey, comprising:
   disposing the seismic source in a body of water; and
   releasing a gas into a volume of water surrounding the seismic source, wherein the released gas displaces the volume of water at a rate less than $2.9 \times 10^6$ m$^3$/s$^3$.

2. The method of claim 1, wherein the rate is in an interval $[0.6 \times 10^6, 1.8 \times 10^6]$ m$^3$/s$^3$.

3. The method of claim 1, wherein the rate is an average rising slope of a primary pressure pulse emitted by the seismic source.

4. The method of claim 3, wherein the average rising slope is calculated by determining an average slope between a 10% point and a 90% point of an unfiltered signature of the primary pressure pulse emitted by the seismic source recorded up to 50 kHz.

5. The method of claim 1, wherein the seismic source comprises:
   an outer cylinder having one or more apertures;
   an inner cylinder having one or more apertures configured to align with the apertures of the outer cylinder at one or more predetermined rotational positions of the inner cylinder, wherein an outer wall of the inner cylinder is flush with an inner wall of the outer cylinder;
   an axis bar coupled to the inner cylinder, wherein the axis bar rotates the inner cylinder;
   a gas supply coupled to the inner cylinder, wherein the gas supply provides a compressed gas inside the inner cylinder; and
   an actuator coupled to the axis bar, wherein the actuator controls a rate of rotation of the inner cylinder that would release the compressed gas into the volume of water surrounding the seismic source.

6. The method of claim 1, wherein the rate is a third differential of the volume of water displaced by the gas with respect to time.

7. The method of claim 6, wherein the third differential of the volume of water displaced by the gas with respect to time is $d^3V/dt^3$.

8. The method of claim 1, wherein the seismic source comprises:
   a barrel;
   an igniter coupled to a base of the barrel;
   a mixture supply coupled to the base of the barrel, wherein the mixture supply provides a combustible mixture to the base of the barrel; and
   an actuator coupled to the igniter, wherein the actuator controls an ignition of the igniter.

9. A seismic source for marine seismic acquisition, comprising:
   a barrel;
   an igniter coupled to a base of the barrel;
   a mixture supply coupled to the base of the barrel, wherein the mixture supply provides a combustible mixture to the base of the barrel; and
   an actuator coupled to the igniter, wherein the actuator controls an ignition of the igniter, and wherein the ignition is configured to combust the combustible mixture such that the combusted combustible mixture displaces a volume of water surrounding the barrel at a rate less than $2.9 \times 10^6$ m$^3$/s$^3$.

10. The seismic source of claim 9, wherein the rate is based on a shape of the barrel and a burn rate of the combustible mixture.

11. The seismic source of claim 9, wherein the barrel is configured to be vertically disposed inside a body of water such that an open end of the barrel is pointed towards the bottom of a sea.

12. A seismic source for marine seismic acquisition, comprising:
    a housing having a compressed gas;
    one or more ports coupled to the housing, wherein the ports are configured to release the compressed gas into the body of water; and one or more radial pipes coupled to the one or more ports, wherein the radial pipes are configured to restrict the released compressed gas such that a flow of a volume of water surrounding the seismic source is at a rate less than $2.9 \times 10^6$ m$^3$/s$^3$.

13. The seismic source of claim 12, wherein each radial pipe comprises:
    a cylinder, wherein a first end of the cylinder is coupled to a port of the seismic source; and
    a bell coupled to a second end of the cylinder.

14. The seismic source of claim 13, wherein the bell comprises:
    a first end coupled to the second end of the cylinder; and
    a second end having a larger radius than the first end of the bell.

15. The seismic source of claim 12, wherein the rate is determined by a length, shape and radius of each radial pipe.

* * * * *